United States Patent [19]

Soderblom

[11] 4,293,948

[45] Oct. 6, 1981

[54] DATA TRANSMISSION SYSTEM

[76] Inventor: Olof Soderblom, Kragenasvagen 21, 181 62 Lidingo, Sweden

[21] Appl. No.: 518,450

[22] Filed: Oct. 29, 1974

Related U.S. Application Data

[63] Continuation of Ser. No. 391,717, Aug. 27, 1973, abandoned, which is a continuation of Ser. No. 773,056, Nov. 4, 1968, abandoned.

[30] Foreign Application Priority Data

Nov. 23, 1967 [SE] Sweden .............................. 16077/67
May 15, 1968 [SE] Sweden ............................... 6589/68

[51] Int. Cl.³ ................................................ H04J 3/16
[52] U.S. Cl. ....................................... 370/90; 370/86; 370/89; 370/97
[58] Field of Search .................... 179/15 AL; 178/24; 370/86, 88, 89, 90, 97

[56] References Cited

U.S. PATENT DOCUMENTS

| | |
|---|---|
| Re. 21,284 | Boswau . |
| 2,091,301 | Boswau . |
| 2,177,609 | Boose . |
| 2,185,851 | Kinkead . |
| 2,238,142 | Weaver . |
| 2,332,645 | Keithley et al. . |
| 2,374,908 | Weaver . |
| 2,502,654 | Keyes . |
| 2,505,728 | Zenner . |
| 2,694,802 | Terry et al. . |
| 2,793,357 | Wynn . |
| 2,840,797 | Derr . |
| 2,954,431 | Royden . |
| 2,974,187 | Barrett et al. . |
| 2,982,809 | Light et al. . |
| 2,986,602 | Tubinis . |
| 3,016,516 | Doersam, Jr. . |
| 3,043,905 | Semancik et al. . |
| 3,078,336 | Cameron et al. . |
| 3,120,606 | Eckert, Jr. et al. . |
| 3,208,049 | Doty, Sr. et al. . |
| 3,214,733 | Spencer et al. . |
| 3,221,307 | Manning . |
| 3,239,819 | Masters . |
| 3,242,467 | Lamy . |
| 3,244,804 | Wittenberg . |
| 3,245,043 | Gaffney, Jr. et al. . |
| 3,281,797 | Harris . |
| 3,303,470 | Brixner et al. . |
| 3,303,476 | Moyer et al. . |
| 3,336,577 | Frielinghaus . |
| 3,336,582 | Beausoleil et al. . |
| 3,344,404 | Curewitz . |
| 3,377,619 | Marsh et al. . |
| 3,417,130 | Rynders . |
| 3,445,822 | Driscoll . |
| 3,456,242 | Lubkin et al. . |
| 3,480,914 | Schlaeppi . |
| 3,483,329 | Hunkins et al. . |
| 3,519,750 7/1970 | Beresin .......................... 179/15 AL |

FOREIGN PATENT DOCUMENTS

| | |
|---|---|
| 702947 | Fed. Rep. of Germany . |
| 1041104 | Fed. Rep. of Germany . |
| 1053360 | Fed. Rep. of Germany . |
| 1121107 | Fed. Rep. of Germany . |
| 1169009 | Fed. Rep. of Germany . |
| 1187263 | Fed. Rep. of Germany . |
| 1197513 | Fed. Rep. of Germany . |
| 1206183 | Fed. Rep. of Germany . |
| 1448803 | France . |
| 62-4921 | Japan . |
| 188775 | Sweden . |
| 882207 | United Kingdom . |
| 903806 | United Kingdom . |
| 930128 | United Kingdom . |
| 987293 | United Kingdom . |
| 993818 | United Kingdom . |

OTHER PUBLICATIONS

"Data Transmission and Switching Equipment for the Seat Reservation System of United Airlines", *Philips Telecommunications Review*, vol. 24, No. 1, Feb. 1963, pp. 13–24.

IBM Technical Disclosure Bulletin 7 (1974/65) pp. 592–593.

Teknisk Tidskrift 1959 pp. 339–344 (Article by J. M. Unk in Swedish Magazine.

Elektroniskt Fjarrstyrningssystem JZA 41 SIB 486/1964 (Leaflet from Swedish Firm L. M. Ericsson AB).

Report of Study Made by the French Firm Le Materiel

Telephonique in LMT 441.632-A, Issue 2 of Dec. 27, 1962.
"Design of Real-Time Computer Systems"; J. Martain; Prentice-Hall; published 9 Oct. 1967; pp. 291-294.

*Primary Examiner*—David L. Stewart
*Attorney, Agent, or Firm*—Pollock, Vande Sande & Priddy

[57] ABSTRACT

The main features of the present invention reside in the fact that one or more remote groups of subordinated terminal units are serially interconnected and arranged in a closed loop which is terminated at the output and input of a master unit. Each of said groups and said master unit is connected to the transmission line via a modulator and a demodulator. In order to selectively connect a pulse equipment associated with each subordinated terminal unit, and adapted for transmission of data, with the transmission line, each of said subordinated terminal units includes a switching unit, which either connects or disconnects the associated pulse equipment from the transmission line. According to the invention, the novelty resides both in the arrangement of the network connecting the subordinated terminal units with the master pulse equipment, and the procedure for the exchange of information between the master pulse equipment and the subordinated terminal unit, and vice versa, through the closed loop, and by selectively actuating said switching unit.

22 Claims, 4 Drawing Figures

DATA TRANSMISSION SYSTEM

CROSS-REFERENCE TO RELATED APPLICATIONS

This application is a continuation of U.S. patent application Ser. No. 391,717 filed Aug. 27, 1973. Application Ser. No. 391,717 is a continuation of U.S. patent application Ser. No. 773,056 filed Nov. 4, 1968 and now abandoned.

BACKGROUND OF THE INVENTION

The present invention relates to a data transmission system for transmitting order-characters, address-characters and information-characters between a master unit and one or more remote groups of subordinated terminal units, the several units in a group normally being disposed at a common location such as a branch bank or store. Each of said groups and said master unit includes a modulator and a demodulator, i.e. a so-called "modem", adapting pulses from the master unit and the subordinated terminal units to the transmission characteristics of the transmission lines which connect said master unit and said subordinated terminal units to each other.

To interconnect an equipment built up of pulse circuits with another such equipment over a relatively long distance, it is necessary to convert the pulses into signals which are adapted to the frequency characteristics of the transmission lines. For this purpose, it is common practice to employ at one end of the line a modulator for converting a pulse into either a phase shifted or frequency shifted pulse relative to a reference signal, and to connect the other end of the line to a demodulator detecting this phase or frequency shift and producing a pulse in correspondence thereto.

In systems where a plurality of pulse equipments disposed at geographically remote places are to be connected to a master pulse equipment, it is common practice to connect these remote pulse equipments and their associated modulator/demodulator units in parallel to one single transmission line for the purpose of shortening the overall length of the transmission lines required. Further, it is common practice to concentrate all pulse equipments which have a common location to one single modulator/demodulator unit by means of a traffic concentrator which, in addition to its concentrating function, effects the control functions required for the above-mentioned parallel connection. This equipment, which effects the interconnection between a plurality of pulse equipments and one single modulator/demodulator unit and enables the connection of a plurality of such units of pulse equipments in parallel to one single transmission line, tends to become rather complicated.

A further disadvantage of connecting a plurality of such units in parallel to one single transmission line resides in that the most efficient mode of transmission, i.e. so called synchronous transmission, cannot be utilized, due to the fact that one demodulator will have to receive signals in alternating order from a plurality of modulators.

A further drawback of the above-mentioned parallel connection resides in that a great number of signals are required for maintaining the order of succession between the units connected to the line, and such sequence signals will intrude upon the time available for the transmission of information.

SUMMARY OF THE INVENTION

The object of the present invention is to provide a system permitting a plurality of commonly located pulse equipments to be connected to one modulator/demodulator unit, and for several modulator/demodulator units disposed at geographically spaced places to be connected to one single transmission line without using any complicated equipments therefor and without involving the drawbacks of a conventional parallel system as indicated hereinbefore, while still maintaining the advantages of the parallel system.

This object of the invention is substantially realized by the fact that the transmission lines connecting the master unit with the modems and subordinated terminal units included in the system are arranged in a closed loop in which modulators, demodulators and subordinated terminal units are serially interconnected. All signals comprising order-characters, address-characters and information-characters are transmitted in the closed loop which is arranged such that the output from the modulator of the master unit is connected to the input of the first demodulator appearing in the loop associated with a first group of subordinated terminal units, which are serially connected with each other and form a closed loop between the output of said first demodulator and the input of the associated first modulator. The output of the first modulator may be connected to the input of a succeeding second demodulator in the series circuit which is associated with a second group of subordinated terminal units and so on, until finally, the last modulator occurring in the loop has its output connected to the input of the demodulator in the master unit, thereby closing the loop.

According to the invention, all modulators, demodulators and subordinated terminal units are serially interconnected between the data output and data input of the master pulse equipment which normally transmits a stream of synchronization characters and, at times, transmits order-characters or information-characters. The first subordinated terminal unit having information to send to the master pulse equipment and receiving order-characters from said master pulse equipment, interrupts the series circuit and transmits the information to the data input of the master pulse equipment via succeeding modulators, demodulators, and subordinated terminal units. The transmission ends with distinctive order-characters which are transmitted around the rest of the loop downstream of such first station and which cause the succeeding subordinated terminal unit with information to send to once again interrupt the series circuit at such succeeding station and send the information to the data input of the master pulse equipment. The said succeeding station similarly ends the transmission with order-characters, and so on, until the last subordinated terminal unit with information to send has, in turn, emitted order-characters which are then finally received by the master pulse equipment, thereby establishing that all subordinated terminal units have sent their information. Information from the master pulse equipment to a particular subordinated terminal unit includes address-characters.

BRIEF DESCRIPTION OF THE DRAWINGS

The invention will now be described more in detail with reference to the accompanying drawings, in which.

DETAILED DESCRIPTION OF THE PREFERRED EMBODIMENT

Figure 1:
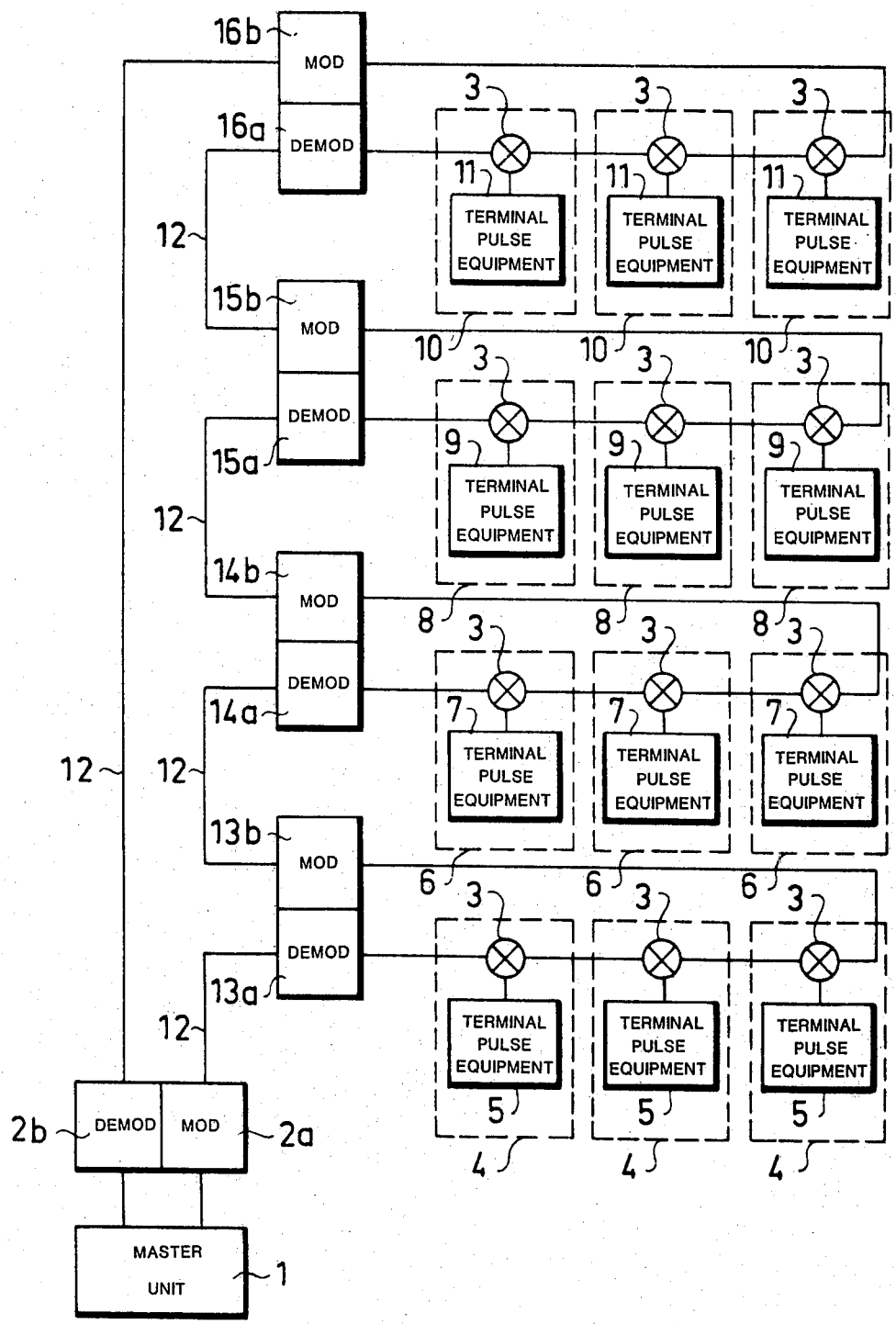
FIG. 1 shows a block diagram illustrating the closed loop of the data transmission system according to the invention.

According to the invention, a plurality of remotely disposed groups of pulse equipments 5, 7, 9, 11 are interconnected and connected to a master pulse equipment 1 via modulator/demodulator units 2a, 2b, 13a, 13b, 14a, 14b, 15a, 15b, 16a, 16b and transmission lines 12. These modulator/demodulator units operate in a manner such that the modulators 2a, 13b, 14b, 15b, and 16b accept pulses at the same rate as pulses are transmitted from the output of the associated demodulators 2b, 13a, 14a, 15a and 16a, respectively.

The system is arranged so that modulator 2a of the master pulse equipment 1 is connected to demodulator 13a via a portionn of line 12. The pulse output of demodulator 13a is connected to the pulse input of modulator 13b via a number of switching units 3. Each switching unit 3 selectively connects a pulse equipment 5 to the master pulse equipment 1. Each pulse equipment 5 and corresponding switching unit 3 form a subordinated terminal unit 4. Modulator 13b is connected to demodulator 14a, associated with the succeeding group of subordinated terminal units, via another portion of line 12. Demodulator 14a is connected to modulator 14b via switching units 3 each of which is connected to a pulse equipment 7 which together form a subordinated terminal unit 6. The system can include an arbitrary number of groups of subordinated terminal units. In the embodiment shown in FIG. 1, the system is terminated at the modulator 16b, which is connected to demodulator 2b at the master pulse equipment. The system according to the invention is not restricted to the number of modulator/demodulator units and switching units 3 as specifically shown in FIG. 1, but is operable with an arbitrary number of both modulator/demodulator units and switching units.

Figure 2:
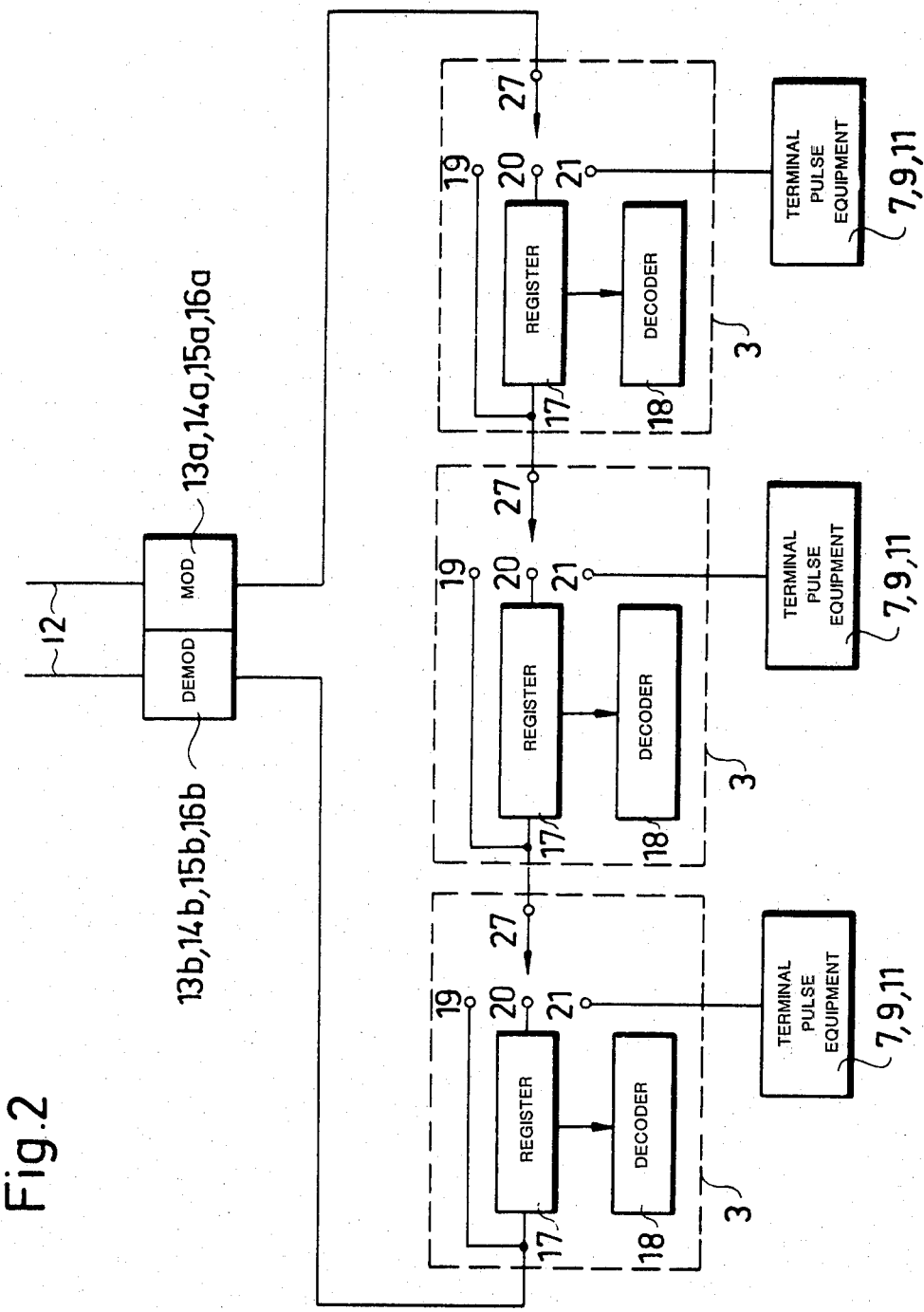
FIG. 2 shows a functional diagram illustrating the function of the switching unit in the transmission system according to FIG. 1.

The function of the switching unit 3 is, in principle, illustrated in FIG. 2, where it is shown as a three-way switch, including switching means 27, a by-pass line, a shift pulse register 17 and a decoding unit 18. In position 19, the switching unit 3 is by-passed in the sense that any characters appearing at the output of the demodulator are not only shifted into the register 17 particularly associated with such switch but are also simultaneously applied to and shifted into the register 17 of the next downstream terminal unit. Obviously, therefore, if all switches 17 are in position 19, any character transmitted by the master pulse equipment will be shifted substantially simultaneously into every register 17.

In position 20, the output of the switch 3 is connected to the input through the pulse register 17 which has a capacity equal to the number of bits forming one unit of information, here called a character. Under these circumstances, the register 17 of the next-downstream terminal unit cannot be directly responsive to a character provided by the demodulator output; instead, such further register can only be responsive to whatever character is shifted out of the first-mentioned register 17 directly associated with the switch which is in position 20.

In the third position 21, the output of the switch 3 is connected directly to the associated pulse equipment 5, 7, 9 or 11. In this circumstance, the associated terminal pulse equipment is effectively connected to the loop, as will be shown, so that this terminal unit can not transmit data back to the master pulse equipment.

To the pulse register 17, which is permanently connected to the input of the switch unit is also connected a decoding unit 18 which identifies certain distinctive characters in the pulse register 17. The manner in which switching unit 3 affects the function of the system according to the invention is as follows:

The system possesses three states of operation, i.e. an idle state, a second state in which information can be transmitted from pulse equipments 5, 7, 9, 11 to the master pulse equipment 1, and, finally, a third state in which information can be transmitted from the master pulse equipment 1 to pulse equipments 5, 7, 9 and 11.

In said idle state, the switching units 3 are all bypassed in the sense described above and the master pulse equipment 1 transmits a continuous flow of characters, each character comprising a pulse combination or character A. The decoder 18 in each terminal unit recognizes the presence of the A character in the associated register 17 and, in response thereto, causes switch 27 to assume position 19. As a result, all the switching units 3 are by-passed, and the pulse output of each demodulator is connected directly to the pulse input of the associated modulator, the flow of characters transmitted by pulse equipment 1 being regenerated in each modulator/demodulator unit and finally returning to the pulse equipment 1 through the demodulator 2b. This flow of characters has two purposes, viz.

(a) to establish synchronism between the oscillator of a demodulator and the oscillator of the preceding modulator, such as, for example, between demodulator 14a and modulator 13b;

(b) to establish synchronism between the pulses transmitted as a character by pulse equipment 1, and the pulses detected as a character by pulse register 17. When the characters received by pulse equipment 1 through demodulator 2b contain the same pulse combination as the characters transmitted from pulse equipment 1, the entire system has become synchronized.

Another method of synchronizing a demodulator with the preceding modulator resides in maintaining a two-way connection between them i.e. to each demodulator an auxiliary modulator is connected, which transmits pulses to an auxiliary demodulator connected to the preceding modulator in the system. By this method, signaling will indicate whether synchronism is being maintained separately between each modulator/demodulator connection.

When the master pulse equipment 1 is ready to receive information from pulse equipments 5, 7, 9, 11, pulse equipment 1 will interrupt the flow of A-characters and transmit two distinctive characters in succession, B and C, and then recommence its transmission of A-characters. The purpose of said B- and C-characters is the following:

The B-character is shifted into the register 17 of each terminal unit substantially simultaneously since each switch 27 is still in position 19. When a B-character has been identified in each pulse register 17 by decoding unit 18, the following procedure will be initiated, provided that the associated pulse equipment 5, 7, 9, 11 has information to transmit. (1) The switching means 27 is set to position 20. (2) The next succeeding character, i.e. the C-character, can now be received only in the register 17 of the first upstream terminal having data to transmit; the reason for this, of course, is that the switch 27 of such first upstream station was operated to position 20 by the B-character, thereby effectively opening the loop so as to prevent any other register 17 from responding to the C-character. (3) Assuming that such next character is a C-character, the switching means 27 of such first upstream unit with data to transmit is set to position 21, thereby permitting only the characters transmitted from the associated pulse equipment to be put on the line. Since the character C only appears in the register 17 of such one unit, it cannot be advanced to the next succeeding terminal unit in the series circuit in response to the next character placed on the loop by the master pulse equipment because with switch 27 in position 21, the register 17 storing the C-character is effectively disconnected at its output from all other downstream registers. As a consequence, no succeeding pulse register 17 will receive character C directly after having received character B. This will cause the associated switching means 27 to be reset to the idle position.

If the terminal unit has no information to transmit when the B-character is detected in pulse register 17, the switching means 27 will retain the idle position. The information transmitted from each of the pulse equipments 5, 7, 9 or 11 will pass through the succeeding switching units in the series circuit to the input of the master pulse equipment 1.

Each transmitting pulse equipment 5, 7, 9 or 11 ends its transmission with the characters B and C and will then reset switching means 27 to the idle position, whereby the sequence of procedures described above will be repeated in the succeeding terminal units in turn.

When characters B and C are received in the master pulse equipment 1, this provides an indication that all pulse equipments 5, 7, 9, 11 in the closed loop have had an opportunity to transmit information, and pulse equipment 1 will respond by transmitting a character, D, indicating that the information transmitted from the subordinated terminal units has been properly received. However, if the information received by pulse equipment 1 contained errors, characters B and C will be transmitted once more and the procedure just described will be repeated. Thus, pulse equipments 5, 7, 9, 11 which have transmitted information but received no D-character will retransmit their information.

Transmission of information from the master pulse equipment 1 to any of the pulse equipments 5, 7, 9, 11 is performed by transmitting two characters E and X before each message. Character E indicates that the next succeeding character X, contains the address to the specific pulse equipment for which the message is meant. This message will pass through all switching units 3, but only the pulse equipment assigned number X will respond to the information.

The switching unit 3 according to the invention has as its main purpose to enable the series connection between the terminal units and the master pulse equipment.

Figure 3:
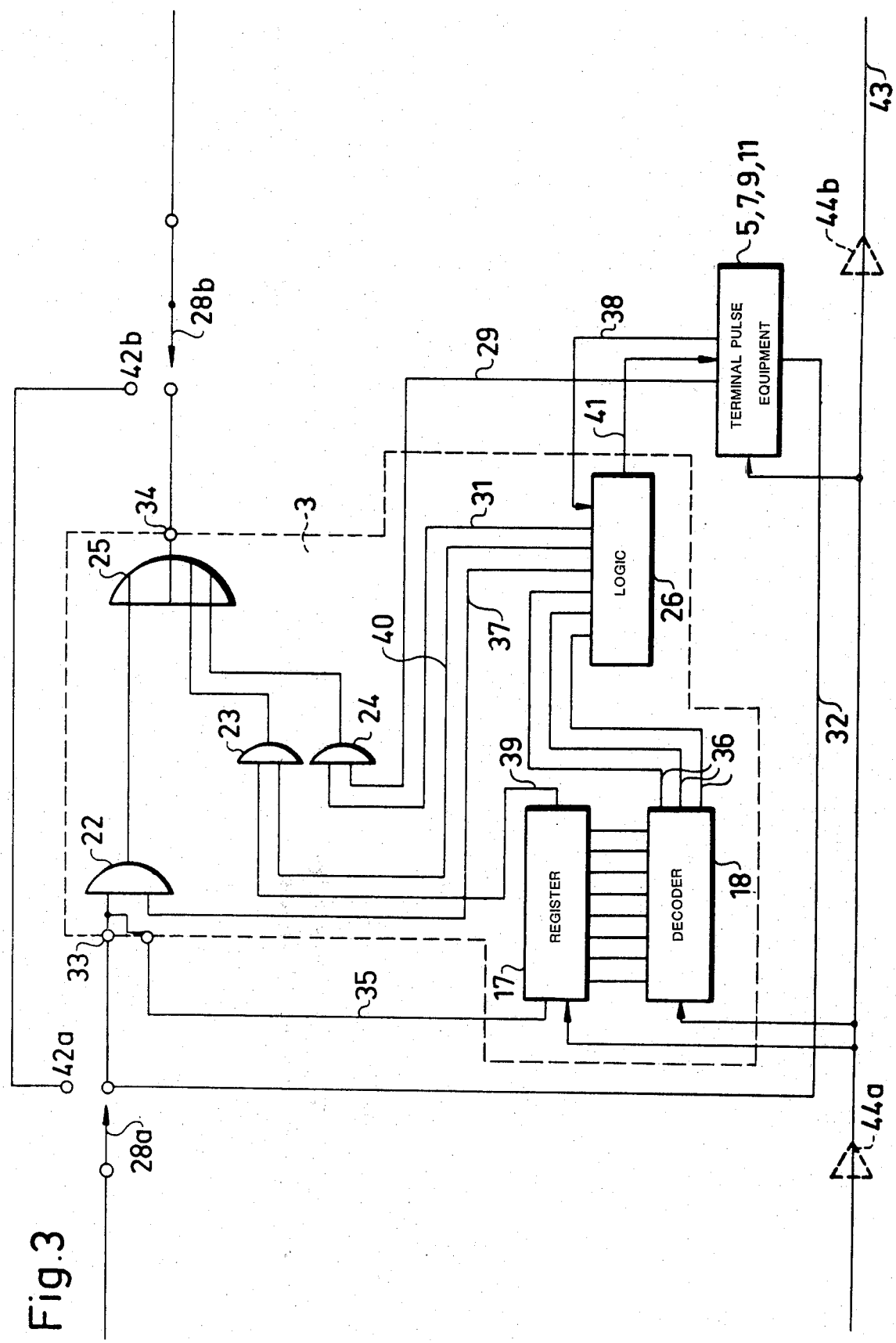
FIG. 3 shows a detailed block diagram of the switching unit.

The unit 3, shown in FIG. 3, comprises three AND-gates 22, 23 and 24, an OR-gate 25 and a control logic 26 having connected thereto a decoding unit 18 and a pulse equipment 5, 7, 9, 11. In the idle position of the switching unit 3, the input 33 and output 34 are effectively connected together through the enabled AND-gate 22 and the OR-gate 25. In the idle state, synchronism is maintained by the decoding unit 18 via a pulse register 17, being operative to decode information appearing at the input 33 of the switching unit 3 via line 35.

When the decoding unit 18 identifies a B-character in the pulse register 17, it emits a signal via lines 36 to the control logic 26 to remove the enabling input to AND-gate 22 via line 37. The pre-requisite is, however, that pulse equipment 5, 7, 9, 11 has informed control logic 26 via line 38, that it has information to transmit. At the same time, the control logic 26 enables AND-gate 23, whereby pulse register 17 is connected to the output 34 of the switching unit 3 through AND-gate 23 and OR-gate 25, corresponding to the second state of the switching unit. If the next-following character received in the pulse register 17 and decoded by decoding unit 18 is a C-character, control logic 26 will disable AND-gate 23 and enable AND-gate 24 via line 31. At the same time, control logic 26 will emit a pulse to the pulse equipment 5, 7, 9, 11 via line 41 informing the latter that it may transmit information on line 29, which now connects output 34 of the switching unit 3 with the pulse equipment via AND-gate 24 and OR-gate 25. This corresponds to the third state of the switching unit. The transmission ends with a signal from pulse equipment 5, 7, 9, 11 to the control logic 26 via line 38 informing same of the fact that all information has been transmitted. Control logic 26 then enables AND-gate 24 and disables AND-gate 22, whereupon the switching unit has been reset to its idle state.

When the switching unit 3 is in the idle state, and decoding unit 18 identifies an address-character in pulse register 17 informing that the information to follow is meant for a specific pulse equipment 5 or 7 or 9 or 11, then decoder 18 will transmit a signal to control logic 26 via lines 36. Control logic 26 then informs the pulse equipment via line 41, whereupon the information is received via line 32. When the decoder has detected a character in the pulse register 17 signifying the end of the message, the pulse equipment is informed by control logic 26. The switches 28a, 28b are meant for shunting of the switching unit 3 and the pulse equipment, for instance in case of break-down or absence of primary power. These switches may consist of a relay taking the positions 42a, 42b, respectively in case of absence of primary power or being controlled by a logic circuit actuating both switches 28a and 28b.

Figure 4:
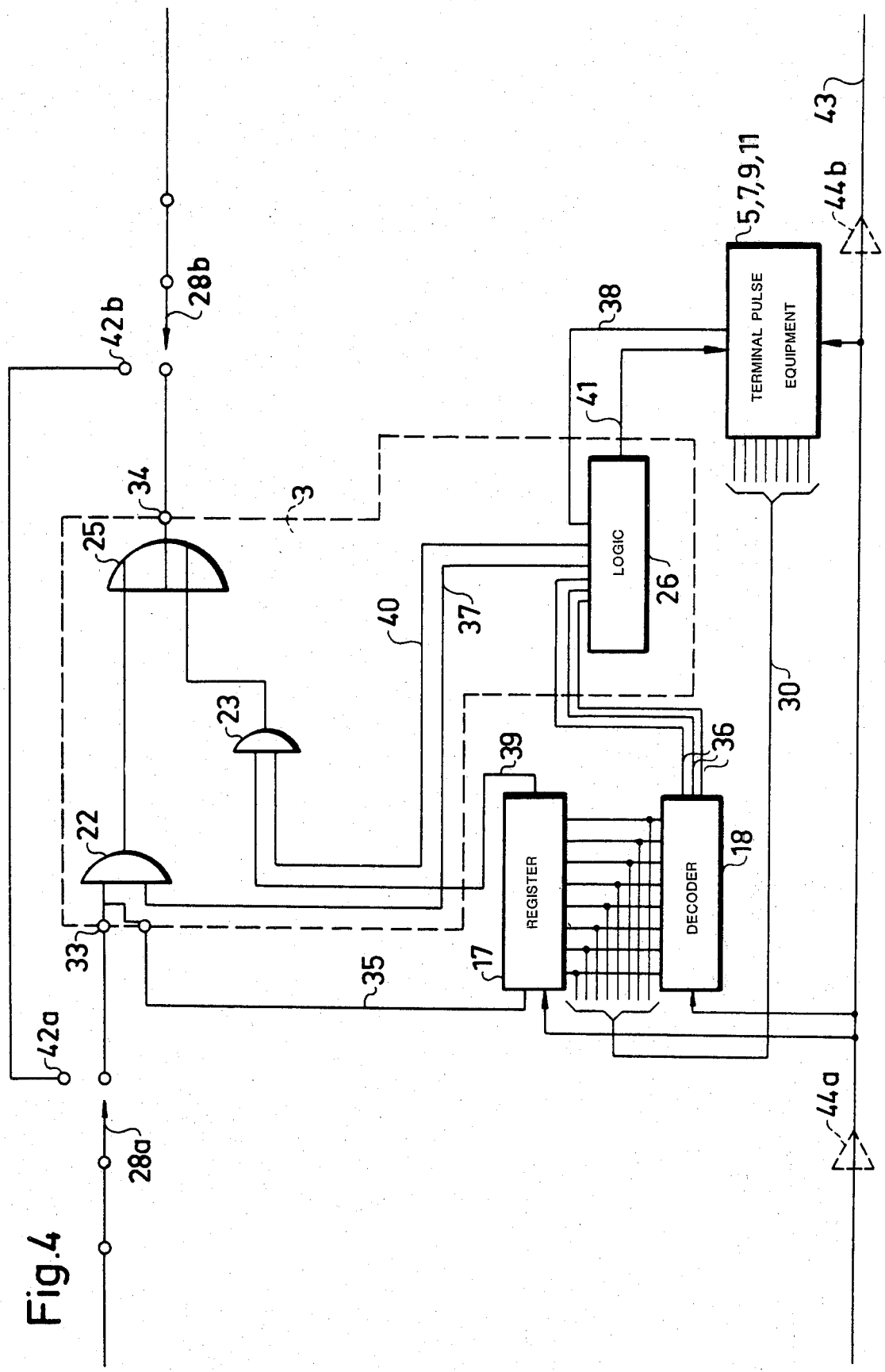
FIG. 4 shows an alternative embodiment of the switching unit.

According to an alternative embodiment of the invention shown in FIG. 4, the switching unit operates with only two switching states. Lines 29 and 31 of FIG. 3 are replaced by parallel lines 30 in FIG. 4 between the pulse equipment 5, 7, 9, 11 on one hand, and pulse register 17 and decoder 18, on the other. Thus, if the character received in the pulse register 17 and decoded by decoding unit 18 is a C-character, the control logic 26 will inform the pulse equipment that it may transmit information on lines 30 via pulse register 17, which is connected with the output 34 of the switching unit via line 39, AND-gate 23 and OR-gate 25. Thus, in this case the conditions of the AND-and OR-gates will not be changed, i.e. that the switching unit will maintain its second switching state.

Information transmitted from the master pulse equipment 1 to a specific pulse equipment 5 or 7 or 9 or 11 is received in said equipment via lines 30 after the control logic 26 has informed the equipment via line 4 that it has information to receive appearing on lines 30.

Which of these two embodiments of the switching unit is preferred depends on whether the pulse equipment is arranged to receive and transmit the bits which constitute a character in serial or parallel.

The rate of all information transmitted and received is preferably determined by a clock included in the demodulator and adapted to control the components of the terminal units 4, 6, 8, 10 via line 43. If required, the clock signal can be amplified at the in- and outputs of each terminal unit by means of amplifiers 44a and 44b, respectively.

The terminal units 4, 5, 8, 10 forming part of a transmission system of the kind here referred to, include, for example, data terminals or computers or any other equipment operating with pulses. In its most extreme form, the data transmission system according to the invention may include only one subordinated terminal unit interconnected with the master pulse equipment via modulator/demodulator units.

What I claim is:

1. Apparatus for the transmission of data characters in pulse form from a plurality of terminal units to a master unit comprising in combination:
    pulse input and pulse output means for each said terminal unit and for said master unit,
    a single series loop connecting said terminal units in series along said loop between the pulse output means and pulse input means of said master unit and over which pulses originating either with said master unit or any terminal unit are transmitted always in the same predetermined direction,
    each said terminal unit including:
    (a) pulse responsive means connected to said pulse input means for receiving pulses appearing at said pulse input means,
    (b) decoding means distinctively responsive to pulses received by said pulse responsive means,
    (c) and logic means responsive to said decoding means for normally interconnecting said pulse input and pulse output means to thereby complete the loop at said terminal unit,
    (d) said logic means in response to a distinctive pattern of said pulses appearing at the associated pulse input means interrrupting the loop between said pulse input and pulse output means only at a terminal unit having data to transmit and enabling the application to the associated pulse output means of stored data of arbitrary variable length as required by said terminal unit for transmission over the loop to said master unit,
    (e) said logic means being effective upon the opening of said loop at the first upstream terminal unit having data to send for inhibiting the receipt at any downstream terminal unit of pulses otherwise effective to control said downstream terminal unit to transmit data.

2. The apparatus of claim 1 wherein each said terminal unit at the conclusion of its data transmission transmitting over said loop pulses to thereby control the downstream terminal units having data to send to serially transmit their data to said master unit.

3. The apparatus of claim 1 wherein said logic means in response to a first distinctive order character appearing at the associated pulse input means opens the normal said interconnection between said pulse input and pulse output means to thereby enable only the first upstream terminal unit having data to send to respond to a second distinctive order character, said logic means being responsive to said second distinctive order character at said pulse input means to enable the application to said pulse output means of the stored data.

4. The aparatus of claim 3 wherein said pulse responsive means comprises a shift register and wherein said logic means when rendered responsive to said second distinctive order character operatively connects said pulse output means to the output of said register to thereby cause the contents of said register to be shifted out of said register and into the register of the next downstream terminal unit in response to the appearance of pulses at said pulse input means.

5. The appaatus of claim 1 in which said master unit includes means for transmitting data characters over said loop in said predetermined direction to one or more selected terminal units.

6. Apparatus for the transmission of data characters in pulse form from a plurality of terminal units to a master unit comprising in combination:
    pulse input and pulse output means for each said terminal unit and for said master unit,
    a single series loop connecting said terminal units in series along said loop between the pulse output means and pulse input means of said master unit and over which pulses originating either with said master unit or any terminal unit are transmitted always in the same predetermined direction,
    each said terminal unit including:
    (a) a pulse responsive means connected to said pulse input means for receiving pulses appearing at said pulse input means,
    (b) decoding means distinctively responsive to the pulses received by said pulse responsive means,
    (c) and logic means being distinctively responsive to at least one distinctive pattern of pulses detected by said decoding means which is the same for each terminal unit and appearing on said loop and effective only when said terminal unit has data to send,
    (d) said logic means when so distinctively rendered responsive enabling the application to said pulse output means of data of any desired variable length as required by said terminal unit for transmission over said loop in said predetermined direction to said master unit,
    (e) the first upstream terminal unit having data to send acting to inhibit the receipt at any downstream terminal unit of a pattern of pulses otherwise effective to control said downstream terminal unit to transmit data.

7. Apparatus for the transmission of data in pulse form a plurality of which constitute a character from a plurality of terminal units to a master unit comprising in combination:
    pulse input and pulse output means for each said terminal unit and for said master unit,
    a single series loop connecting said terminal units in series along said loop between the pulse output means and pulse input means of said master unit and over which pulses originating either with said master unit or any terminal unit are transmitted always in the same predetermined direction,
    a pulse responsive means connected to said pulse input means at each said terminal unit and responsive to each coded character appearing at said pulse input means, decoding means at each terminal unit distinctively responsive to different characters received by said pulse responsive means, logic means at each said terminal unit controlled by said decoding means and responsive to a distinctive synchronizing character transmitted from said master unit for operatively interconnecting said pulse input means to said pulse output means to thereby cause any character transmitted over said loop to be substantially simultaneously received at each terminal unit and be received by said pulse responsive means, said logic means at said plurality of terminal units being further responsive to the reception of at least one distinctive character simultaneously at said plurality of terminal units to operatively disconnect said pulse input means from said pulse output means only at each terminal unit having data to send, and means at said plurality of terminal units and effective only at those terminal units which responded to said distinctive character for controlling said terminal units sequentially to transmit data over said loop and via successive downstream terminal units to said master unit.

8. The apparatus of claim 7 which includes means controlled by said logic means and effective when the associated terminal unit has data to send and receives said first distinctive character for connecting said pulse input means to said pulse output means only through said pulse responsive means, whereby each said pulse responsive means included in a terminal unit having data to send is included in series in said loop.

9. Apparatus for the transmission of data in pulse form a plurality of which constitute a character from a plurality of terminal units to a master unit comprising in commbination:

pulse input and puse output means for each said terminal unit and for said master unit, a single series loop connecting said terminal units in series along said loop between the pulse output means and input means of the master unit and over which pulses originating either with said master unit or any terminal unit are transmitted always in the same predetermined direction, first means at each terminal unit responsive to a first distinctive signal appearing at the associated pulse input means only if said terminal unit has data to send for opening said loop, second means at each terminal unit which is effective in response to a second distinctive signal applied to the associated pulse input means only at those terminal units which responded to said first signal for applying to the associated pulse output means the data stored at said terminal unit for transmission over said series loop to said master unit, means at each said terminal unit responsive to a signal other than said second signal and received from the immediately preceding upstream station for reclosing the loop at said terminal unit.

10. Apparatus for the transmission of data from a plurality of terminal units to a master unit comprising in combination:

pulse input and pulse output means for each said terminal unit and for said master unit, a single series loop connecting said terminal units in series along said loop between the pulse output means and input means of the master unit and over which pulses originating either with said master unit or any terminal unit are transmitted always in the same predetermined direction, and means at said plurality of terminal units, and initiated into operation in response to signals transmitted over said loop, said signals acting serially only on said means at a single terminal unit at a time and only on those terminal units having data to transmit and in the order in which they appear on said loop in said predetermined direction to interrupt said loop and to apply to said loop for transmission over the remainder of the loop to said master unit the data of arbitrary variable length stored at the respective terminal unit.

11. The apparatus of claim 10 in which said master unit includes means for transmitting data characters over said loop in said predetermined direction to one or more selected terminal units.

12. Apparatus for the transmission of data characters in pulse form from a plurality of remote stations to a master unit comprising in combination:

at least one terminal unit included in each said remote station;

a modulator and a demodulator for each said remote station and for said master unit;

said at least one terminal unit at each said remote station being connected serially between the demodulator and the modulator for the associated station, said remote stations being serially connected to each other over a series loop extending between the modulator and demodulator of said master unit;

each said terminal unit including, (a) a register for receiving and storing distinctive characters transmitted over said series loop both from said master unit and from any upstream remote station, (b) decoding means distinctively responsive to the characters stored in the associated register, (c) logic means responsive to said decoder, (d) data storage means for storing data for selective transmission over said loop to said master unit, and, (e) pulse input means and pulse output means, (f) a gate connected between said pulse input and pulse output means, said logic means being at times operable in response to distinctive pulse signals appearing on said loop and in the associated register to open said gate and thereby prevent the application of pulses to said pulse output means from said pulse input means and to connect said data storage means to said pulse output means for transmission of said data over said loop to said master unit, said logic means being effective upon the opening of said loop at the first upstream terminal unit having data to send for inhibiting the receipt at any downstream terminal unit of an order character otherwise effective to control said downstream terminal unit to transmit data.

13. Aparatus for the transmission of data from a plurality of remote stations to a master unit comprising in combination:

at least one terminal unit included in each said remote station;

a modulator and a demodulator for each said remote station and for said master unit;

said at least one terminal unit at each said remote station being connected serially between the demodulator and the modulator for the associated station, said remote stations being serially connected to each other over a series loop extending between the modulator and demodulator of said master unit;

each said terminal unit including, (a) a register for receiving and storing distinctive characters transmitted over said series loop both from said master unit and from any upstream remote station, (b) decoding means distinctively responsive to the characters stored in the associated register, (c) logic means controlled by said decoder, (d) data storage means for storing data for selective transmission over said loop to said master unit, and (e) pulse input means and pulse output means, said logic means being normally in a first condition wherein said logic means is effective to connect said pulse input means to said pulse output means, said logic means being further operable to a second condition in response to a distinctive signal appearing in said register at a time when said data storage means is storing data for transmission to said master unit to disconnect said pulse output means from said pulse input means to thereby open said loop at each terminal unit having data to send, said logic means when in its said second condition being additionally responsive to a particular distinctive signal appearing in said register to operatively connect said data storage means to said data output means only at the first upstream terminal unit which had data to send, said logic means when in its said second condition being responsive to any further signal in said register other than said particular distinctive signal to restore said logic means to its said first condition and thereby connect said data input means to said data output means at all terminal units other than said first upstream terminal unit.

14. The apparatus of claim 13 wherein said logic means when in its said second condition connects said pulse input means to said pulse output means only through said register.

15. Apparatus for the transmission of data characters in the form of pulses from a plurality of remote stations to a master unit comprising in combination:

at least one terminal unit included in each said remote station;

a modulator and a demodulator for each said remote station and for said master unit;

said at least one terminal unit at each said remote station being connected serially between the demodulator and the modulator for the associated station, said remote stations being serially connected to each other over a series loop extending between the modulator and demodulator of said master unit and over which pulses originating with either said master unit or any terminal unit are transmitted always in the same predetermined direction; each said terminal unit including means normally effective to maintain said series loop closed at said terminal unit but being responsive to distinctive signals appearing on said loop to interrupt said loop and to apply to said loop pulses of any number as determined solely by said terminal unit for transmission to said master unit.

16. Apparatus for the transmission of data from a plurality of terminal units to a master unit comprising in combination:

pulse input and pulse output means for each said terminal unit and for said master unit, a single series loop connecting said terminal units in series along said loop between the pulse output means and pulse input means of said master unit and over which pulses originating either with said master unit or any terminal unit are transmitted always in the same predetermined direction, first means at each said terminal unit responsive to a distinctive first signal appearing at the associated pulse input means only when said terminal unit has data to send for operatively disconnecting said pulse input means from said pulse output means, second means at each said terminal unit responsive to a distinctive second signal appearing at the associated pulse input means only provided that said first means has been rendered responsive to said distinctive first signal for applying the data stored at said terminal unit to the associated pulse output means, each said terminal unit at the termination of its transmission of data over said loop to said master unit transmitting both said distinctive first and second characters and also operatively reconnecting the associated pulse input and pulse output means, whereby the transmission of said distinctive first and second characters by said master unit causes the transmission of data only from the first upstream station in said loop having data to send and the subsequent transmission of said distinctive first and second characters by said first upstream station causes the transmission of data only from the next station downstream of said first upstream station which had data to send, and so on, until every station in said loop which had data to send has transmitted its data in turn over said loop to said master unit.

17. A method of data transmission between a master unit and a plurality of remote terminal units each having a pulse input and a pulse output which are normally operatively interconnected and with said terminal units being serially connected in a loop extending from the pulse output to the pulse input of the master unit, said method comprising the steps of:

transmitting from said master unit to each said terminal unit over said loop a first distinctive signal, decoding said first signal at each terminal unit and in response thereto interrupting said loop provided only that said terminal unit has data to transmit, transmitting from said master unit over said now interrupted loop a second distinctive signal, decoding said second signal only at the first upstream terminal unit which had data to transmit and in response thereto applying to said loop the data stored at said terminal unit for transmission to said master unit, transmitting again at the termination of the data transmission from said first upstream terminal unit said first and second distinctive signals.

18. A method of data transmission between a master unit and a plurality of terminal units each having a pulse input and a pulse output and with said terminal units being serially interconnected in a loop extending from the pulse output to the pulse input of the master unit, said method comprising the steps of:

at times transmitting at least one distinctive order character over said loop from said pulse output of said master unit to initiate a cycle of data transmission from all those terminal units, one at a time, which are ready to transmit data to said master unit, in response to said at least one distinctive order character interrupting said loop only at a terminal unit having data to send and applying to said loop at said terminal unit the stored data of arbitrary variable length for transmission to said master unit, said transmission of data from said master unit and also from each said terminal unit always occurring in the same direction around said loop.

19. A method of synchronous data transmission over a loop comprising a serial transmission channel extending between the output and input of a master unit and having a plurality of terminal units each including an input and an output which are serially connected in said loop, each terminal unit being selectively operable between two distinctive conditions in a first of which its input is effectively connected to its output and in the second of which the input is not connected to the output and in response to signals appearing at the input said terminal unit is operated between its two said distinctive conditions, the transmission of data from the master unit or from any terminal unit proceeding always in the same direction over the loop, the method steps comprising:

controlling each terminal unit to its said first condition in response to the receipt of a first distinctive signal at its input as monitored by the associated register, controlling each terminal unit having data to send to its second distinctive condition in response to the reception of a second distinctive signal at its input as monitored by the associated register, and thereafter transmitting stored data over said loop only from the first upstream terminal unit which is now in its second distinctive condition following the resetting of each downstream terminal unit which was operated to its said second distinctive condition back to its said first distinctive condition.

20. The method of claim 19 wherein said first upstream terminal unit at the conclusion of its data transmission transmits over the loop a further second distinctive character to thereby control all downstream terminal units having data to transmit to their second distinctive condition, and thereafter transmitting over the loop the stored data from the first downstream terminal unit of the group of terminal units which was operated to its second distinctive condition in response to said further second distinctive character while concurrently restoring to its first distinctive condition each remaining terminal unit.

21. Apparatus for the transmission of data from a plurality of terminal units to a master unit comprising in combination:

pulse input and pulse output means for each said terminal unit and for said master unit, a single series loop connecting said terminal units in series along said loop between the pulse output means and input means of the master unit and over which pulses originating either with said master unit or any terminal unit are transmitted always in the same predetermined direction, control means at any one of said terminal units which is rendered effective, only when said terminal unit has data to transmit, in response to a single occurrence on said loop of distinctive signals applied to the associated pulse input means, said control means when so rendered effective opening at least at the first upstream terminal unit having data to transmit a normally closed by-pass means which when in its normally closed condition permits the retransmission from the output means of said one terminal unit of any signals appearing at its input means, and further means effective at the first upstream terminal unit with data to transmit and when its said by-pass means is open for applying to said output means the data of whatever length is then stored at said one terminal unit, and additional means at each said terminal unit for applying to said pulse output means at the conclusion of data transmission said distinctive signals to initiate the transmission of data from the next downstream terminal unit having data to transmit, whereby the single occurrence of a transmission of said distinctive signals from said master unit initiates a cycle of data trasmission sequentially from all terminal units having data to transmit.

22. A method of data transmission between a master unit and a plurality of terminal units each having a pulse input and a pulse output and with said terminal units being serially interconnected in a loop extending from the pulse output to the pulse input of the master unit, said method comprising the steps of:

transmitting onto said loop from said master unit distinctive signals when it is desired to initiate a cycle of data transmission from all terminal units having data to transmit, responding to each occurrence of said distinctive signals at least at the first upstream terminal unit ready to transmit data to the master unit by opening a normally closed by-pass which is effective only when closed to repeat at the output means of said terminal unit the signals received from said loop at its input means, applying to the output means the data of whatever length is then stored at said terminal unit while said by-pass is open, transmitting from the output means of said terminal unit at the conclusion of data transmission said distinctive signals to initiate the transmission of data from the next downstream station ready to transmit data to the master unit, and initiating a cycle of data transmission from all terminal units having data to transmit by a single transmission from said master unit of said distinctive signals.

* * * * *